(12) United States Patent
Ludwig et al.

(10) Patent No.: US 8,997,795 B2
(45) Date of Patent: Apr. 7, 2015

(54) FLEXIBLE HOSE FOR HIGH PRESSURES AND TEMPERATURES INCLUDING A CHARGE-AIR HOSE AND A COOLING-WATER HOSE

(75) Inventors: Ligia Ludwig, Kassel (DE); Gerhard Will, Hannoversch-Münden (DE); Robert Dill, Göttingen (DE)

(73) Assignee: ContiTech MGW GmbH, Hannoversch-Muenden (DE)

(*) Notice: Subject to any disclaimer, the term of this patent is extended or adjusted under 35 U.S.C. 154(b) by 339 days.

(21) Appl. No.: 12/805,661

(22) Filed: Aug. 12, 2010

(65) Prior Publication Data

US 2011/0023988 A1 Feb. 3, 2011

Related U.S. Application Data

(63) Continuation of application No. PCT/EP2009/050297, filed on Jan. 13, 2009.

(30) Foreign Application Priority Data

Feb. 15, 2008 (DE) .......................... 10 2008 009 598
Dec. 5, 2008 (DE) .......................... 10 2008 055 480

(51) Int. Cl.
| | |
|---|---|
| *F16L 11/00* | (2006.01) |
| *F16L 11/04* | (2006.01) |
| *F16L 11/08* | (2006.01) |
| *F01P 11/04* | (2006.01) |
| *F02M 35/10* | (2006.01) |

(52) U.S. Cl.
CPC ............... *F16L 11/042* (2013.01); *F01P 11/04* (2013.01); *F02M 35/10157* (2013.01); *F02M 35/10321* (2013.01); *F02M 35/10334* (2013.01); *F16L 11/086* (2013.01)

(58) Field of Classification Search
USPC ........................................ 138/126, 128, 129
See application file for complete search history.

(56) References Cited

U.S. PATENT DOCUMENTS

| | | | | |
|---|---|---|---|---|
| 1,798,798 A | * | 3/1931 | Leguillon ....................... 138/126 |
| 1,972,755 A | * | 9/1934 | Blaisdell ........................ 138/126 |
| 2,358,743 A | * | 9/1944 | Smith ............................ 138/128 |
| 2,424,315 A | * | 7/1947 | Hyatt et al. ................... 138/128 |
| 3,190,315 A | * | 6/1965 | Taylor et al. .................. 138/127 |
| 3,418,404 A | * | 12/1968 | Hird ........................... 264/171.12 |
| 3,462,177 A | * | 8/1969 | Skinner et al. .............. 285/222.2 |
| 3,535,891 A | * | 10/1970 | Corey ............................... 66/1 A |
| 3,886,980 A | * | 6/1975 | Elson ............................. 138/127 |

(Continued)

FOREIGN PATENT DOCUMENTS

| | | |
|---|---|---|
| EP | 0 490 568 | 6/1992 |
| EP | 1 013 979 | 6/2000 |

*Primary Examiner* — James Hook
(74) *Attorney, Agent, or Firm* — Walter Ottesen P.A.

(57) ABSTRACT

A flexible hose (1) has at least two textile reinforcement inlays or inserts (5, 6, 7) and an inner layer (2) made of elastomeric material. The flexible hose can assume various curvature geometries and, on the other hand, is still pressure-resistant because a textile reinforcement inlay (5) made of a peripherally closed, tubular knitted or woven fabric is applied to the elastomeric inner layer (2). A textile layer (6), which is rubber-coated on both sides, is wound as a further textile reinforcement inlay onto the tubular knitted or woven fabric (5).

14 Claims, 5 Drawing Sheets

(56) References Cited

U.S. PATENT DOCUMENTS

| | | | | |
|---|---|---|---|---|
| 3,905,399 | A | * | 9/1975 | Dunnet ........................ 138/129 |
| 4,102,724 | A | * | 7/1978 | Taylor ........................... 156/149 |
| 4,111,237 | A | * | 9/1978 | Mutzner et al. ............... 138/125 |
| 4,181,157 | A | * | 1/1980 | DeCamp ....................... 138/126 |
| 4,273,160 | A | * | 6/1981 | Lowles .......................... 138/124 |
| 4,380,252 | A | * | 4/1983 | Gray et al. .................... 138/125 |
| 4,488,577 | A | * | 12/1984 | Shilad et al. .................. 138/127 |
| 4,675,221 | A | * | 6/1987 | Lalikos et al. ................ 138/110 |
| 4,706,712 | A | * | 11/1987 | Oglesby et al. ............... 138/126 |
| 5,052,444 | A | * | 10/1991 | Messerly et al. ............. 138/125 |
| 5,077,108 | A | | 12/1991 | Ozawa et al. |
| 5,683,773 | A | | 11/1997 | Kemper |
| 6,099,925 | A | * | 8/2000 | Le Nouveau et al. ........ 428/36.9 |
| 6,455,115 | B1 | * | 9/2002 | DeMeyer ..................... 428/36.2 |
| 6,742,545 | B2 | * | 6/2004 | Fisher et al. .................. 138/137 |
| 7,063,181 | B1 | * | 6/2006 | Cunningham ................ 181/233 |
| 7,694,695 | B2 | * | 4/2010 | Johnson et al. ............... 138/123 |
| 2002/0100516 | A1 | * | 8/2002 | Powell et al. ................. 138/125 |
| 2003/0113495 | A1 | * | 6/2003 | Janusson et al. ............. 428/36.1 |
| 2004/0144440 | A1 | * | 7/2004 | Lundberg et al. ............ 138/130 |
| 2005/0199308 | A1 | * | 9/2005 | Swails et al. ................. 138/109 |
| 2005/0238832 | A1 | * | 10/2005 | Kostamo ................... 428/36.91 |
| 2006/0223399 | A1 | | 10/2006 | Kurimoto et al. |
| 2007/0186989 | A1 | | 8/2007 | Seyler et al. |
| 2008/0000540 | A1 | | 1/2008 | Seyler |
| 2009/0049869 | A1 | * | 2/2009 | Malloy et al. .................. 66/170 |

* cited by examiner

FLEXIBLE HOSE FOR HIGH PRESSURES AND TEMPERATURES INCLUDING A CHARGE-AIR HOSE AND A COOLING-WATER HOSE

CROSS REFERENCE TO RELATED APPLICATIONS

This application is a continuation application of international patent application PCT/EP 2009/050297, filed Jan. 13, 2009, designating the United States and claiming priority from German applications 10 2008 009 598.2 and 10 2008 055 480.4, filed Feb. 15, 2008 and Dec. 5, 2008, respectively, and the entire content of all the applications is incorporated herein by reference.

FIELD OF THE INVENTION

The invention relates to a flexible hose for high pressures and temperatures having at least a textile reinforcement insert and an inner layer of elastomeric material.

BACKGROUND OF THE INVENTION

Charge-air hoses serve to connect a turbocharger to a charge-air cooler (hot end) and to connect a charge-air cooler to the engine (cold end). Both ends have to withstand pressures up to 3 bar overpressure and also have to compensate for the relative movement between engine and charge-air cooler.

There are known charge-air hoses for charge-air lines and also cooling-water hoses for cooling-water lines which each have an extruded elastomeric inner layer onto which a tubular knit or a tubular braid has been knitted or braided. Extruded onto this there is an external layer made of elastomeric material. The extruded inner layer can be composed of one or more individual layers. Hoses of this type are flexible and pressure-resistant up to overpressures of about 3 bar.

In order to achieve higher pressure resistance, attempts have been made to arrange an intermediate elastomer layer and a further layer made of a circular knit or circular braid between the circular knit or circular braid and the extruded external layer. Although the higher pressure resistance was satisfactory, it was very difficult to produce complicated curved-hose geometries because the increased stiffness of this type of hose limits small radii of the hose curves and larger expansion at the ends of the hose.

There are also known wound hoses composed of one or more wound layers. The wound layers are composed of knit or woven material coated with an elastomeric material on one or both sides. These wound hoses are resistant to high pressure but create difficulties in further processing, since, as the number of wound layers increases, the increase in stiffness makes it difficult to produce hoses with expanded ends for the attachment of fittings, and hoses with complicated curved geometries.

United States patent application publication 2008/0000540 A1 discloses a flexible hose which has, embedded in an elastomeric wall, a pressure-resistant structure which comprises at least one pressure-resistant element that, in essence, takes the form of a filament or wire. The pressure-resistant structure is knitted onto the initially extruded elastomeric inner layer. An elastomeric external layer is then applied by extrusion. Although this is a flexible hose, it has low pressure resistance.

EP 1 013 979 A2 discloses a charge-air hose equipped with a pressure-resistant structure encompassing at least one woven material layer. The pressure-resistant structure is rubber-coated and is wound onto an auxiliary mandrel before it is introduced to the actual vulcanization process. By virtue of the plurality of wound layers, this wound hose is excessively stiff and difficult to mold to curved geometries.

Newly designed highly charged engines require hoses which comply with stringent requirements in relation to flexibility but are also suitable for high overpressures (greater than 3 bar). The automobile industry is constantly developing ever smaller engines with ever higher performance ratings per liter of cylinder volume and charge-air pressures are therefore ever higher with a resultant requirement for new hose systems for these pressures which give the same flexibility.

Hoses provided hitherto emphasize either flexibility or adequate pressure resistance, but not both simultaneously.

SUMMARY OF THE INVENTION

It is an object of the invention to provide a charge-air hose that is firstly flexible for producing a variety of curvature geometries but that is also pressure-resistant for the high pressure demands resulting from recent engine developments.

The object is achieved by applying, on the elastomeric inner layer, a textile reinforcement insert or inlay made of a peripherally continuous, tubular knit or braid, on which a bilaterally rubberized textile layer has been wound as a further textile reinforcement insert or inlay.

The charge-air hose has a tubular knit or braid on an inner elastomer layer. A bilaterally rubberized textile layer, with one or more windings, is wound about the inner elastomer layer. The textile layer has been bilaterally rubberized to bring about an adhesive bond to the knit or braid of the hose and to the other wrappings of the wound layer of the textile layer.

The combination of tubular knit or braid and the wound layer made of a textile layer effectuates a limited radial expansion of the hose, which is a decisive factor for a long service life under pressure loads while providing comparatively good axial flexibility. The design of the embodiment according to the invention significantly increases the service life by considering the tensile strain experienced by the hose when it is exposed to pressure together with forced mechanical movements caused by temperature effects, since defects and microcracks due to excessive stretching within the elastomer matrix are avoided. Any excessive expansion of the tubular knit or braid caused by pressure peaks is prevented by the use of the wound layers of the textile layer.

An advantage of the knit is that, through selection of the appropriate knit pattern, mesh geometries, yarn materials, yarn counts and suitable knitting heads, the manufacture of complex hose geometries is made possible while dynamic strength is not as high as compared with a braid.

The braid affords the advantage, through selection of the appropriate yarn materials, yarn counts, number of ends and ideal braiding angle, of enabling manufacture of hoses that can be subjected to high dynamic load, for hose geometries that are less complex than when a knit is used.

A knit in the form of textile reinforcement is one produced from one or more yarns or yarn systems by looping of the yarn. The yarns here run in a transverse direction. The knit has sufficient strength while retaining flexibility. Although a textile insert made of woven material would be pressure-resistant, because of the relatively high thread count, it would be too stiff.

The tubular textile reinforcement insert can also have been configured as an open braid which facilitates direct contact between rubberized wound layer and elastomeric inner layer.

The wound textile insert is advantageously a flat knit. Because of the specific way in which the threads run within the flat knit, it is relatively flexible in all directions and has good draping qualities.

It is further advantageous that the wound textile layer is a flat knit.

It is further advantageous that the wound textile layer is a flexible flat woven material. This is stretchable in one direction. Transverse and longitudinal threads can move with respect to one another at their crossover points.

If the wound textile layer has been butt-wound, uniform wall thickness is achieved in the hose.

If the wound textile layer has been overlap-wound, the hose composite has stronger seams.

In another embodiment of the invention, the wound textile layer has been wound a plurality of times around the periphery of the tubular knit or braid with a resultant marked increase in the pressure resistance of the hose.

In another embodiment of the invention, the wound textile layer has been wound spirally around the tubular knit or braid at a defined angle. This permits a semicontinuous production.

Another embodiment of the invention provides that a wound layer of a second flat knit is applied around the wound layer of the first flat knit, where the second flat knit is at least externally rubberized. This additional layer minimizes expansion and distributes the pressure over three layers (one layer of knit or braid in the hose and two layers of flat knit). One-sided rubberizing is more advantageous for total wall thickness, since there is less change of wall thickness at the overlap location.

In an advantageous embodiment of the invention, an elastomeric external layer made of elastomeric material has been applied to the exterior wound textile reinforcement insert.

The hose structured as in the invention is suitable for the hot and the cold ends of a turbocharger.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
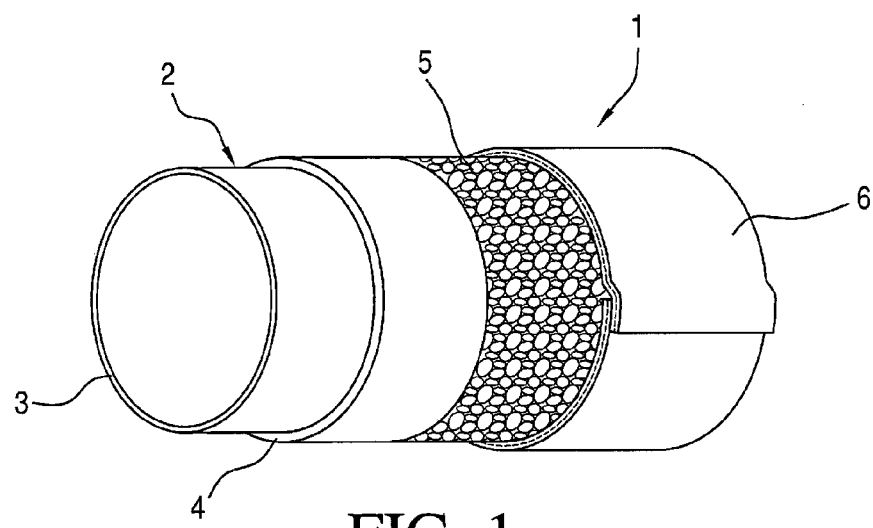
FIG. 1 is a stepped-cutaway side perspective schematic of a composite or fabricated charge-air hose having a textile reinforcement insert made of a tubular shaped knit and a further textile insert made of a wound rubberized flat knit.

The charge-air hose 1 shown in FIG. 1 has a two-layer inner layer 2 extruded from elastomeric material and composed of an FPM (fluororubber) barrier layer 3 and a VMQ (silicone rubber) intermediate layer 4. On this inner layer 2, there is a tubular circular knit 5 applied, the yarn of which is made of m-aramid. A wound layer 6 made of bilaterally rubberized flat knit made of m-aramid is twice wound around the circular knit in an overlapping manner. The flat knit 6 is usually prerubberized in a calendering process.

Once this unvulcanized hose has been structured (manufactured), it is vulcanized to completion in an autoclave on a mandrel designed appropriately for the desired curvature geometry.

Figure 2:
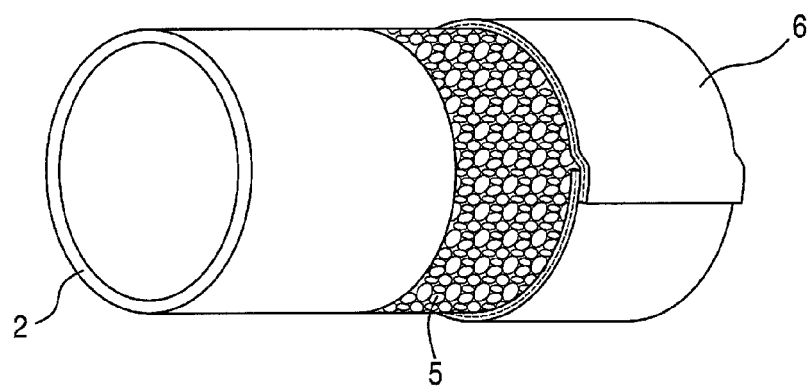
FIG. 2 shows a hose structure as in FIG. 1 for a charge-air hose for the cold end in which the inner rubber layer is one layer.

The hose structure in FIG. 2 differs from the hose structure of FIG. 1 in that the extruded elastomeric inner layer 2 has only a single layer. The elastomeric material of the inner layer 2 is a rubber material: AEM (ethylene-acrylate rubber). The material of the circular knit 5 is made of a p-aramid. The wound layer 6 is composed of a bilaterally rubberized flat knit likewise made of p-aramid material. The rubberizing material for the flat knit 6 is composed of the rubber material AEM or ACM (acrylate rubber).

Figure 3:
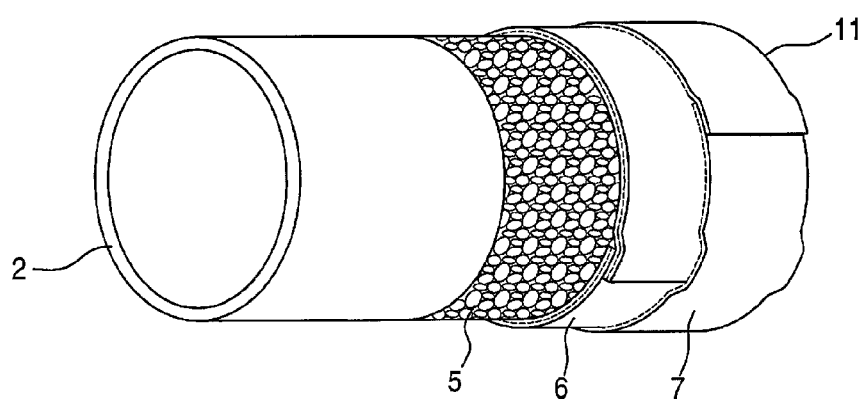
FIG. 3 shows a hose structure as in FIG. 1 with a further, outer, monolaterally rubberized wound layer made of flat knit and an applied outer rubber layer.

FIG. 3 shows a modified hose structure which has, in addition to the extruded inner layer 2 and the tubular circular knit 5, and the bilaterally rubberized wound layer 6 made of flat knit, a further, second, wound layer 7 made of flat knit, rubberized only monolaterally and externally.

Around said second wound layer 7, it is possible to apply an elastomeric external layer made of elastomeric material: AEM or ACM. In FIG. 3, reference numeral 11 identifies the elastomeric material applied to the second textile reinforcement layer 7.

Figure 4:
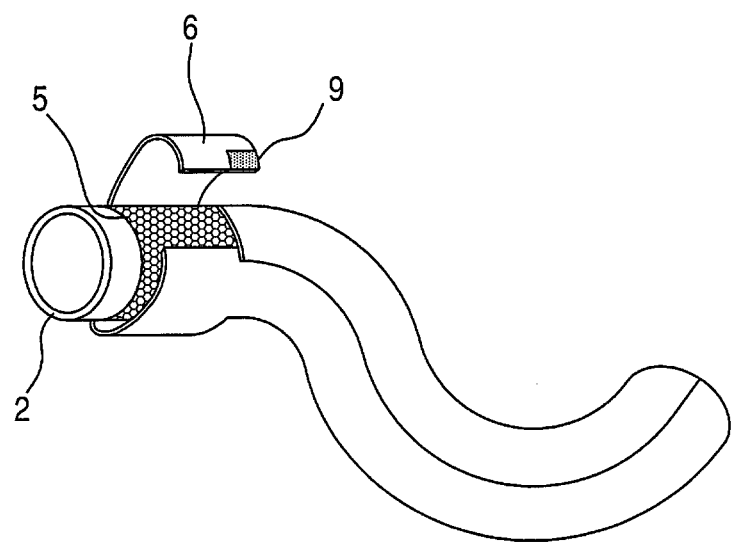
FIG. 4 shows a vulcanized curved charge-air hose in which, for reasons of simplicity, a portion of the flat knit layer has been shown folded back from the knit tube, omitting the rubber coating of the flat knit in a small subregion.

FIG. 4 shows the charge-air hose of FIG. 2 in the form of a vulcanized curved hose. This has an extruded inner layer 2, on which the tubular knit 5 has been applied circumferentially. Around this structure, the flat knit 6 has been overlapped with a wound layer where the flat knit 6 has been bilaterally covered with an elastomer layer. The upper elastomer layer has been shown as broken away in the subregion 9 to reveal a portion of the rubberized flat knit 6.

As a function of the intended application, it can be possible to overlap or butt the flat knit 6. In specific applications, it is also possible to produce a relatively narrow flat knit 6 and to form this spirally, always with lateral edges overlapping, around the hose structure provided with the knit tube or braid tube 5.

Figure 5:
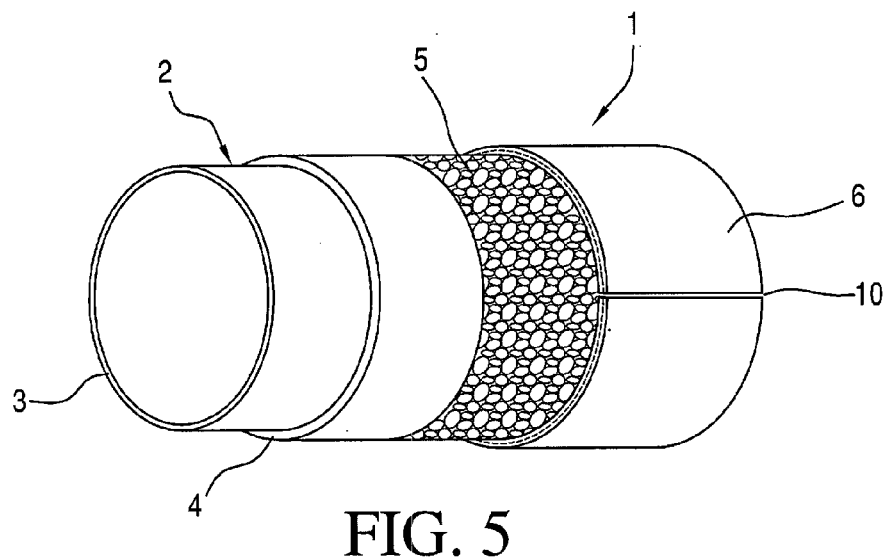
FIGS. 5 and 6 show hose structures as in FIGS. 1 and 2, except that the outer layer is butt-wound.
Figure 6:
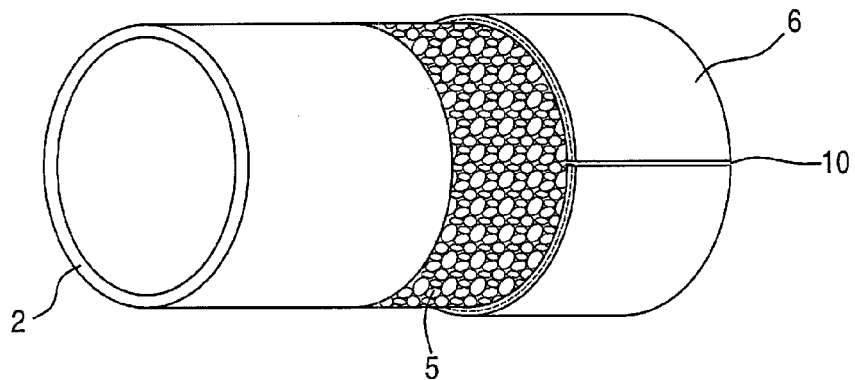

Thus, FIGS. 5 and 6 show the layer 6 as being butt-wound with the butt-wound location identified by reference numeral 10.

Figure 7:
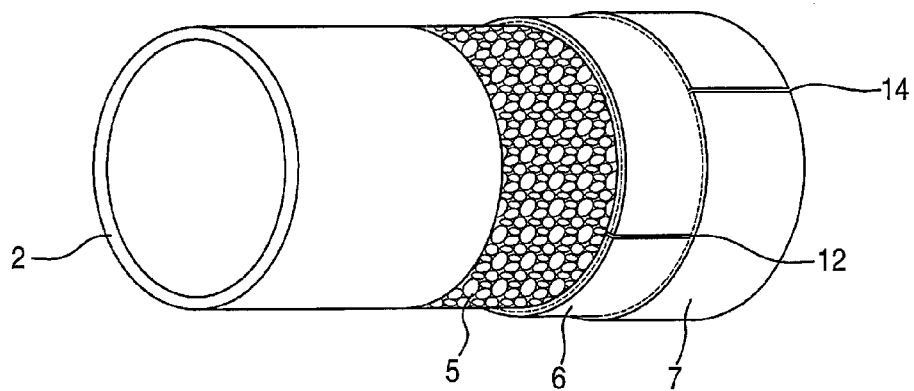
FIG. 7 corresponds to FIG. 3 and shows the first and second wound layers as being butt-wound.

FIG. 7 corresponds to FIG. 3 except that a butt-wound connection is provided which is identified by reference numerals 12 and 14 for layers 6 and 7, respectively.

Figure 8:
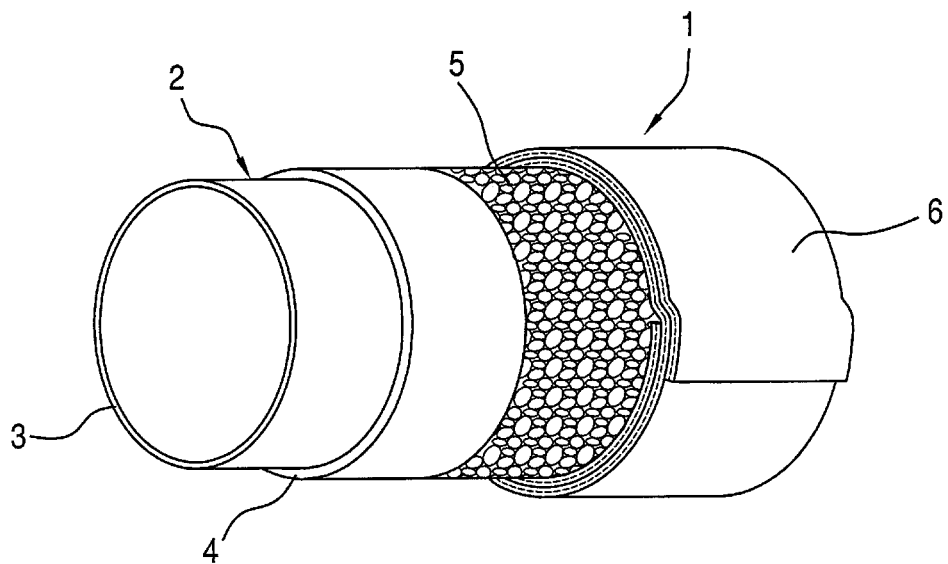
FIGS. 8 and 9 show the outer reinforcement layer wound a plurality of times; and, FIGS. 10 and 11 correspond to FIGS. 1 and 2, respectively, except that the outer reinforcement layer is spirally wound.
Figure 9:
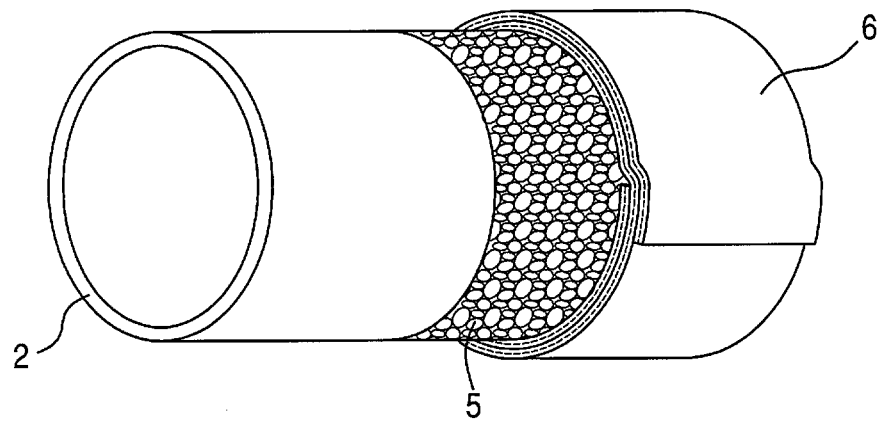

FIGS. 8 and 9 show the textile layer 7 wound around the periphery of the textile reinforcement layer 5 a plurality of times.

Figure 10:
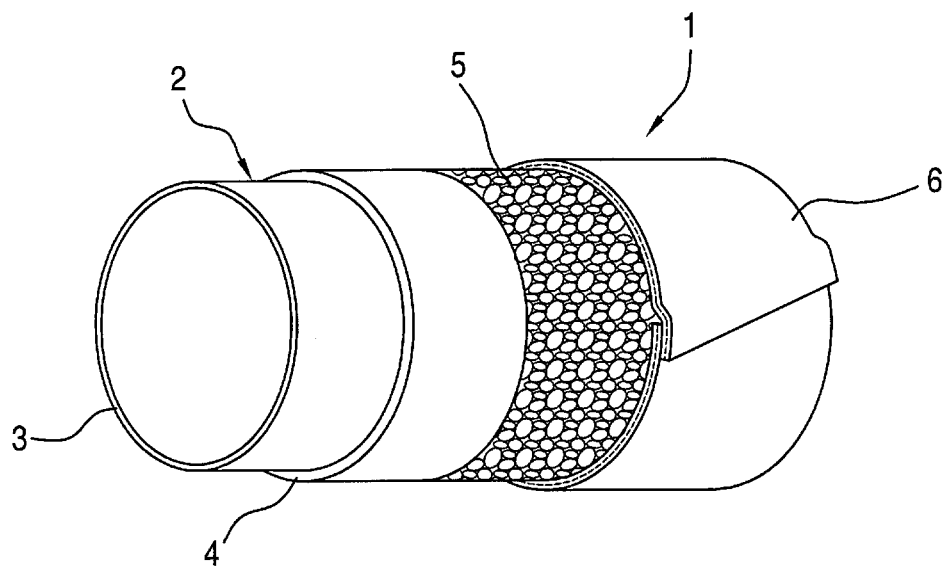
Figure 11:
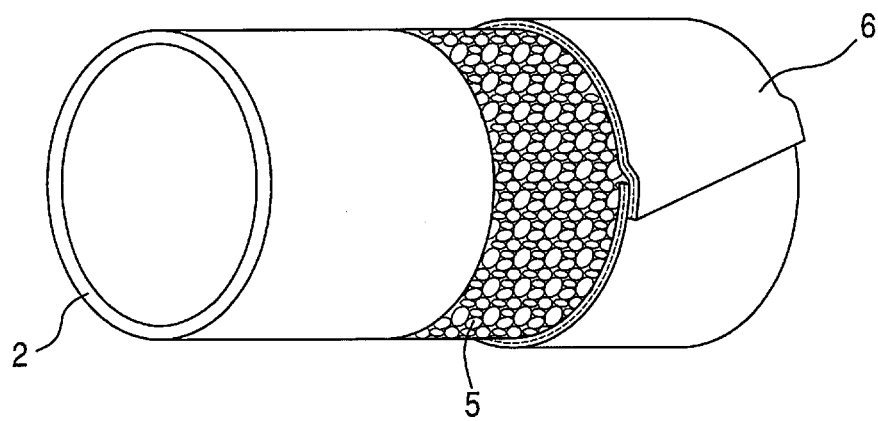

FIGS. 10 and 11 show the second textile reinforcement layer 6 spirally wound.

It is understood that the foregoing description is that of the preferred embodiments of the invention and that various changes and modifications may be made thereto without departing from the spirit and scope of the invention as defined in the appended claims.

What is claimed is:

1. A charge-air hose or a cooling-water hose comprising:
an elastomeric inner layer;
a first textile reinforcement layer applied to said elastomeric inner layer;
said first textile reinforcement layer being made of a tubular knit or braid;

a second textile reinforcement layer wound on said first textile reinforcement layer;

said second textile reinforcement layer having an inner side facing toward said first textile reinforcement layer and an outer side facing away from said first textile reinforcement layer;

said second textile reinforcement layer being bilaterally rubberized;

said second textile reinforcement layer being selected from the group consisting of a flat knitted fabric, a flat woven fabric and a flexible flat woven material;

said hose having a curvature and being vulcanized to completion after said second textile reinforcement layer has been wound on said first textile layer;

said hose being flexible in an axial direction; and, said hose having expanded ends.

2. The hose of claim 1, wherein said second textile reinforcement layer is said flat knitted fabric.

3. The hose of claim 2, wherein said flat knitted fabric is a first flat knitted fabric; and, wherein said hose further comprises a second flat knitted fabric having an outer side and being applied around said first flat knitted fabric; and, said second flat knitted fabric is rubberized on at least said outer side.

4. The hose of claim 3, further comprising an outer layer of elastomeric material applied to said second flat knitted fabric.

5. The hose of claim 1, wherein said second textile reinforcement layer is said flat woven fabric.

6. The hose of claim 1, wherein said second textile reinforcement layer is said flexible flat woven material.

7. The hose of claim 1, wherein said second textile reinforcement layer is butt-wound on said first textile reinforcement layer.

8. The hose of claim 1, wherein said second textile reinforcement layer is overlap-wound on said first textile reinforcement layer.

9. The hose of claim 1, wherein said second textile reinforcement layer is wound around the periphery of said first textile reinforcement layer a plurality of times.

10. The hose of claim 1, wherein said second textile reinforcement layer is wound spirally around said first textile reinforcement layer at a predetermined angle.

11. The hose of claim 1, further comprising an outer layer of elastomeric material being applied to said second textile reinforcement layer.

12. The hose of claim 1, wherein said outer side of said second textile reinforcement layer is also rubberized to effectuate a good adhesive bond to an additional wrapping of a wound layer thereof.

13. A charge-air hose or a cooling-water hose comprising:
an elastomeric inner layer;
a first textile reinforcement layer applied to said elastomeric inner layer;
said first textile reinforcement layer being made of a tubular braid;
a second textile reinforcement layer wound on said first textile reinforcement layer;
said second textile reinforcement layer having an inner side facing toward said first textile reinforcement layer and an outer side facing away from said first textile reinforcement layer;
said second textile reinforcement layer being bilaterally rubberized;
said first textile reinforcement layer being configured as an open braid to facilitate direct contact between said rubberized second textile reinforcement layer and said elastomeric inner layer;
said second textile reinforcement layer being selected from the group consisting of a flat knitted fabric, a flat woven fabric and a flexible flat woven material;
said hose having a curvature and being vulcanized to completion after said second textile reinforcement layer has been wound on said first textile layer;
said hose being flexible in an axial direction; and,
said hose having expanded ends.

14. A charge-air hose or a cooling-water hose comprising:
an elastomeric inner layer;
a first textile reinforcement layer applied to said elastomeric inner layer;
said first textile reinforcement layer being made of a tubular braid;
a second textile reinforcement layer wound on said first textile reinforcement layer;
said second textile reinforcement layer being a first flat knit and having an inner side facing toward said first textile reinforcement layer and an outer side facing away from said first textile reinforcement layer;
said first textile reinforcement layer being configured as an open braid to facilitate direct contact between said rubberized second textile reinforcement layer and said elastomeric inner layer;
a third textile reinforcement layer being wound as a second flat knit applied around the wound layer of said first flat knit;
said second textile reinforcement layer being rubberized on said outer side to effectuate an adhesive bond to said third textile reinforcement layer;
said hose having a curvature and being vulcanized to completion after said second textile reinforcement layer has been wound on said first textile layer;
said hose being flexible in an axial direction; and,
said hose having expanded ends.

* * * * *